United States Patent
Kotani et al.

(10) Patent No.: US 11,095,475 B2
(45) Date of Patent: Aug. 17, 2021

(54) COMMUNICATION FAILURE DETECTION DEVICE

(71) Applicant: TOYOTA JIDOSHA KABUSHIKI KAISHA, Toyota (JP)

(72) Inventors: Akihiro Kotani, Toyota (JP); Makoto Oishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/736,924

(22) Filed: Jan. 8, 2020

(65) Prior Publication Data
US 2020/0287746 A1 Sep. 10, 2020

(30) Foreign Application Priority Data

Mar. 6, 2019 (JP) .............................. JP2019-040820

(51) Int. Cl.
*H04L 12/40* (2006.01)
*H04L 29/14* (2006.01)
*H04L 12/70* (2013.01)

(52) U.S. Cl.
CPC ........ *H04L 12/40176* (2013.01); *H04L 69/40* (2013.01); *H04L 2012/40215* (2013.01); *H04L 2012/5627* (2013.01)

(58) Field of Classification Search
None
See application file for complete search history.

(56) References Cited

U.S. PATENT DOCUMENTS 7,124,051 B2 * 10/2006 Patterson .......... B60W 50/0205
702/122
9,031,740 B2 * 5/2015 Kuramochi ......... H04L 43/0811
701/36

(Continued)

FOREIGN PATENT DOCUMENTS

| JP | 2006-135375 A | 5/2006 |
| JP | 2010-111295 A | 5/2010 |
| JP | 2016-020185 A | 2/2016 |

OTHER PUBLICATIONS

H. Huangshui and Q. Guihe, "Online Fault Diagnosis for Controller Area Networks," 2011 Fourth International Conference on Intelligent Computation Technology and Automation, Shenzhen, China, 2011, pp. 452-455. (Year: 2011).*

(Continued)

*Primary Examiner* — Ayaz R Sheikh
*Assistant Examiner* — Tarell A Hampton
(74) *Attorney, Agent, or Firm* — Sughrue Mion, PLLC

(57) ABSTRACT

There is provided a communication failure detection device configured to detect a communication failure of a two-wire CAN communication device that makes communication between nodes according to a CAN protocol. Each of the nodes is provided with two signal detection circuits configured to detect signals on the two communication lines. Each node makes communication for failure dentification to output signals of predetermined patterns onto the two communication lines when an execution condition is satisfied in response to the occurrence of a protocol error of CAN communication. Each node then performs failure identification to identify the type of a failure based on a combination of the signals respectively detected by the two signal detection circuits during the communication for failure identification.

5 Claims, 14 Drawing Sheets

(56) References Cited

U.S. PATENT DOCUMENTS

| | | | |
|---|---|---|---|
| 10,310,934 B2* | 6/2019 | Du | G06F 11/0709 |
| 10,606,796 B2* | 3/2020 | Hirata | H04L 67/12 |
| 2002/0062460 A1* | 5/2002 | Okuda | H04L 1/24 |
| | | | 714/25 |
| 2002/0097720 A1* | 7/2002 | Goodman | H04L 69/329 |
| | | | 370/392 |
| 2005/0218904 A1* | 10/2005 | Shimoyama | G01R 31/40 |
| | | | 324/522 |
| 2010/0017661 A1* | 1/2010 | Queck | H04L 12/40006 |
| | | | 714/43 |
| 2010/0174439 A1* | 7/2010 | Petricoin, Jr. | H04L 67/18 |
| | | | 701/31.4 |
| 2011/0035180 A1* | 2/2011 | Jin | H04L 12/66 |
| | | | 702/122 |
| 2012/0155285 A1* | 6/2012 | Smart | H04L 41/0609 |
| | | | 370/242 |
| 2015/0082096 A1* | 3/2015 | Jiang | G06F 11/079 |
| | | | 714/37 |
| 2016/0163125 A1* | 6/2016 | Kim | G07C 5/008 |
| | | | 701/31.4 |
| 2017/0286351 A1* | 10/2017 | Williams | H04L 67/104 |
| 2018/0314572 A1* | 11/2018 | Du | G06F 11/0709 |
| 2019/0044750 A1* | 2/2019 | Granados | H04L 12/40169 |
| 2020/0049754 A1* | 2/2020 | Hubbard | H04L 12/40006 |
| 2020/0160629 A1* | 5/2020 | Walker | H04L 12/40006 |

OTHER PUBLICATIONS

H. Xiao and Y. Lei, "Data driven root cause analysis for intermittent connection faults in controller area networks," 2013 Chinese Automation Congress, Changsha, China, 2013, pp. 300-305 (Year: 2013).*

J. Zhao and Y. Lei, "Modeling for early fault detection of intermittent connections on controller area networks," 2012 IEEE/ASME International Conference on Advanced Intelligent Mechatronics (AIM), Kaohsiung, Taiwan, 2012, (Year: 2012).*

E. A. Mossin and D. Brandão, "Intelligent diagnostic for PROFIBUS DP networks," 2012 IEEE International Conference on Industrial Technology, Athens, Greece, 2012, pp. 772-777 (Year: 2012).*

O. Kleineberg and M. Felser, "Network diagnostics for industrial Ethernet," 2008 IEEE International Conference on Emerging Technologies and Factory Automation, Hamburg, Germany, 2008, pp. 476-479 (Year: 2008).*

Y. Lei, H. Xie, Y. Yuan and Q. Chang, "Fault Location for the Intermittent Connection Problems on CAN Networks," in IEEE Transactions on Industrial Electronics, vol. 62, No. 11, pp. 7203-7213, Nov. 2015 (Year: 2015).*

* cited by examiner

| COMMUNICATION PATTERN FOR FAILURE IDENTIFICATION | ECU1 | ECU2 | BUS VOLTAGE IN NORMAL STATE | | DURATION TIME |
|---|---|---|---|---|---|
| | | | CANH | CANL | |
| PATTERN a | DOMINANT | RECESSIVE | 3.5V | 1.5V | 500ms |
| PATTERN b | RECESSIVE | RECESSIVE | 2.5V | 2.5V | 500ms |
| PATTERN c | RECESSIVE | DOMINANT | 3.5V | 1.5V | 500ms |

FIG. 6

| FAILURE MODE | | FAILURE IDENTIFICATION MATRIX | | |
|---|---|---|---|---|
| | | | PATTERN a | PATTERN b | PATTERN c |
| NORMAL | | CANH | 3.5V | 2.5V | 3.5V |
| | | CANL | 1.5V | 2.5V | 1.5V |
| TRANSMISSION PATH FAILURE | CANH DISCONNECTION | CANH | 3.5V | 2.5V | 1.5 V (ABNORMAL) |
| | | CANL | 1.5V | 2.5V | 1.5V |
| | CANL DISCONNECTION | CANH | 3.5V | 2.5V | 3.5V |
| | | CANL | 1.5V | 2.5V | 3.5 V (ABNORMAL) |
| | CANH- 5 V POWER SOURCE SHORT CIRCUIT | CANH | 5.0 V (ABNORMAL) | 5.0 V (ABNORMAL) | 5.0 V (ABNORMAL) |
| | | CANL | 1.5V | 5.0 V (ABNORMAL) | 1.5V |
| | CANH- GND SHORT CIRCUIT | CANH | 0.0 V (ABNORMAL) | 0.0 V (ABNORMAL) | 0.0 V (ABNORMAL) |
| | | CANL | 1.5V | 0.0 V (ABNORMAL) | 1.5V |
| | CANL- 5 V POWER SOURCE SHORT CIRCUIT | CANH | 3.5V | 5.0 V (ABNORMAL) | 3.5V |
| | | CANL | 5.0 V (ABNORMAL) | 5.0 V (ABNORMAL) | 5.0 V (ABNORMAL) |
| | CANL- GND SHORT CIRCUIT | CANH | 3.5V | 0.0 V (ABNORMAL) | 3.5V |
| | | CANL | 0.0 V (ABNORMAL) | 0.0 V (ABNORMAL) | 0.0 V (ABNORMAL) |
| | CANH- CANL SHORT CIRCUIT | CANH | 2.5 V (ABNORMAL) | 2.5V | 2.5 V (ABNORMAL) |
| | | CANL | 2.5 V (ABNORMAL) | 2.5V | 2.5 V (ABNORMAL) |
| NODE FAILURE | FAILURE OF OWN OR OPPONENT ECU (DOMINANT FIXATION) | CANH | 3.5V | 3.5 V (ABNORMAL) | 3.5V |
| | | CANL | 1.5V | 1.5 V (ABNORMAL) | 1.5V |
| | FAILURE OF OWN ECU (RECESSIVE FIXATION) | CANH | 2.5 V (ABNORMAL) | 2.5V | 3.5V |
| | | CANL | 2.5 V (ABNORMAL) | 2.5V | 1.5V |
| | FAILURE OF OPPONENT ECU (RECESSIVE FIXATION) | CANH | 3.5V | 2.5V | 2.5 V (ABNORMAL) |
| | | CANL | 1.5V | 2.5V | 2.5 V (ABNORMAL) |
| OTHER (NOT IDENTIFIED) | | CANH | OTHER | | |
| | | CANL | | | |

FIG. 7

| FAILURE MODE | | | FAILURE IDENTIFICATION MATRIX | | |
|---|---|---|---|---|---|
| | | | PATTERN a | PATTERN b | PATTERN c |
| NORMAL | | CANH | +16.6mA | 0mA | −16.6mA |
| | | CANL | −16.6mA | 0mA | +16.6mA |
| TRANSMISSION PATH FAILURE | CANH DISCONNECTION | CANH | 0mA(ABNORMAL) | 0mA | 0mA(ABNORMAL) |
| | | CANL | −2mA(ABNORMAL) | 0mA | +2mA(ABNORMAL) |
| | CANL DISCONNECTION | CANH | +2mA(ABNORMAL) | 0mA | −2mA(ABNORMAL) |
| | | CANL | 0mA(ABNORMAL) | 0mA | 0mA(ABNORMAL) |
| | CANH− 5 V POWER SOURCE SHORT CIRCUIT | CANH | −30mA(ABNORMAL) | −2mA(ABNORMAL) | −30mA(ABNORMAL) |
| | | CANL | −30mA(ABNORMAL) | 0mA | +30mA(ABNORMAL) |
| | CANH− GND SHORT CIRCUIT | CANH | +50mA or more(ABNORMAL) | +2mA(ABNORMAL) | +2mA(ABNORMAL) |
| | | CANL | 0mA(ABNORMAL) | 0mA | 0mA(ABNORMAL) |
| | CANL− 5 V POWER SOURCE SHORT CIRCUIT | CANH | 0mA(ABNORMAL) | 0mA | 0mA(ABNORMAL) |
| | | CANL | −50mA or less(ABNORMAL) | −2mA(ABNORMAL) | −2mA(ABNORMAL) |
| | CANL− GND SHORT CIRCUIT | CANH | +30mA(ABNORMAL) | 0mA | −30mA(ABNORMAL) |
| | | CANL | +30mA(ABNORMAL) | +2mA(ABNORMAL) | +30mA(ABNORMAL) |
| | CANH− CANL SHORT CIRCUIT | CANH | 0mA(ABNORMAL) | 0mA | 0mA(ABNORMAL) |
| | | CANL | 0mA(ABNORMAL) | 0mA | 0mA(ABNORMAL) |
| NODE FAILURE | FAILURE OF OWN ECU (DOMINANT FIXATION) | CANH | +16.6mA | +16.6mA(ABNORMAL) | 0mA(ABNORMAL) |
| | | CANL | −16.6mA | −16.6mA(ABNORMAL) | 0mA(ABNORMAL) |
| | FAILURE OF OPPONENT ECU (DOMINANT FIXATION) | CANH | 0mA(ABNORMAL) | +16.6mA(ABNORMAL) | −16.6mA |
| | | CANL | 0mA(ABNORMAL) | −16.6mA(ABNORMAL) | +16.6mA |
| | FAILURE OF OWN OR OPPONENT ECU (RECESSIVE FIXATION) | CANH | 0mA(ABNORMAL) | 0mA | 0mA(ABNORMAL) |
| | | CANL | 0mA(ABNORMAL) | 0mA | 0mA(ABNORMAL) |
| OTHER (NOT IDENTIFIED) | | CANH | OTHER | | |
| | | CANL | | | |

FIG. 11

|  | BUS VOLTAGE | STATE SIGNALS |
|---|---|---|
| CANH | 5.0V | HIGH ABNORMALITY STATE |
| CANH | 3.5V | DOMINANT STATE |
| CANH | 2.5V | RECESSIVE STATE |
| CANH | 1.5V, 0.0V | LOW ABNORMALITY STATE |
| CANL | 3.5V, 5.0V | HIGH ABNORMALITY STATE |
| CANL | 2.5V | RECESSIVE STATE |
| CANL | 1.5V | DOMINANT STATE |
| CANL | 0.0V | LOW ABNORMALITY STATE |

FIG. 13

| FAILURE MODE | | | FAILURE IDENTIFICATION MATRIX | | |
|---|---|---|---|---|---|
| | | | PATTERN a | PATTERN b | PATTERN c |
| NORMAL | | CANH | DOMINANT STATE | RECESSIVE STATE | DOMINANT STATE |
| | | CANL | DOMINANT STATE | RECESSIVE STATE | DOMINANT STATE |
| TRANSMISSION PATH FAILURE | CANH DISCONNECTION | CANH | DOMINANT STATE | RECESSIVE STATE | LOW ABNORMALITY STATE |
| | | CANL | DOMINANT STATE | RECESSIVE STATE | DOMINANT STATE |
| | CANL DISCONNECTION | CANH | DOMINANT STATE | RECESSIVE STATE | DOMINANT STATE |
| | | CANL | DOMINANT STATE | RECESSIVE STATE | HIGH ABNORMALITY STATE |
| | CANH- 5 V POWER SOURCE SHORT CIRCUIT | CANH | HIGH ABNORMALITY STATE | HIGH ABNORMALITY STATE | HIGH ABNORMALITY STATE |
| | | CANL | DOMINANT STATE | HIGH ABNORMALITY STATE | DOMINANT STATE |
| | CANH- GND SHORT CIRCUIT | CANH | LOW ABNORMALITY STATE | LOW ABNORMALITY STATE | LOW ABNORMALITY STATE |
| | | CANL | DOMINANT STATE | LOW ABNORMALITY STATE | DOMINANT STATE |
| | CANL- 5 V POWER SOURCE SHORT CIRCUIT | CANH | DOMINANT STATE | HIGH ABNORMALITY STATE | DOMINANT STATE |
| | | CANL | HIGH ABNORMALITY STATE | HIGH ABNORMALITY STATE | HIGH ABNORMALITY STATE |
| | CANL- GND SHORT CIRCUIT | CANH | DOMINANT STATE | LOW ABNORMALITY STATE | DOMINANT STATE |
| | | CANL | LOW ABNORMALITY STATE | LOW ABNORMALITY STATE | LOW ABNORMALITY STATE |
| | CANH- CANL SHORT CIRCUIT | CANH | RECESSIVE STATE(ABNORMAL) | RECESSIVE STATE | RECESSIVE STATE(ABNORMAL) |
| | | CANL | RECESSIVE STATE(ABNORMAL) | RECESSIVE STATE | RECESSIVE STATE(ABNORMAL) |
| NODE FAILURE | FAILURE OF OWN OR OPPONENT ECU (DOMINANT FIXATION) | CANH | DOMINANT STATE | DOMINANT STATE(ABNORMAL) | DOMINANT STATE |
| | | CANL | DOMINANT STATE | DOMINANT STATE(ABNORMAL) | DOMINANT STATE |
| | FAILURE OF OWN ECU (RECESSIVE FIXATION) | CANH | RECESSIVE STATE(ABNORMAL) | RECESSIVE STATE | DOMINANT STATE |
| | | CANL | RECESSIVE STATE(ABNORMAL) | RECESSIVE STATE | DOMINANT STATE |
| | FAILURE OF OPPONENT ECU (RECESSIVE FIXATION) | CANH | DOMINANT STATE | RECESSIVE STATE | RECESSIVE STATE(ABNORMAL) |
| | | CANL | DOMINANT STATE | RECESSIVE STATE | RECESSIVE STATE(ABNORMAL) |
| OTHER (NOT IDENTIFIED) | | CANH | OTHER | | |
| | | CANL | | | |

FIG. 14

COMMUNICATION FAILURE DETECTION DEVICE

The present disclosure claims priority to Japanese Patent Application No. 2019-040820 filed Mar. 6, 2019, which is incorporated herein by reference in its entirety including specification, drawings and claims.

TECHNICAL FIELD

The present disclosure relates to a communication failure detection device configured to detect a communication failure of a two-wire CAN (Controller Area Network) communication device that makes communication between nodes according to a CAN protocol.

BACKGROUND

A proposed abnormality diagnosis device is connected via connectors with two-wire CAN communication lines that are respectively branch-connected with a plurality of nodes, and performs abnormality diagnosis of H lines (High lines) and L lines (Low line) of the respective CAN communication lines (as described in, for example, JP 2010-111295A). This abnormality diagnosis device includes a joint circuit provided to connect the H lines of the respective CAN communication lines with each other and to connect the L lines of the respective CAN communication lines with each other, and a disconnection unit (relay) configured to individually disconnect the respective lines of the respective CAN communication lines from the joint circuit. The abnormality diagnosis device also includes a test H line and a test L line that are to be connected with the H lines and the L lines of the respective CAN communication lines, a test resistance connected with the test H line and with the test L line, and a potential measurement device connected with the test H line and with the test L line. The abnormality diagnosis device causes the H line and the L line of a CAN communication line that is an object of diagnosis to be disconnected from the joint circuit and to be connected with the test H line and the test L line, measures the potentials of the test H line and the test L line by using the potential measurement device, and performs abnormality diagnosis based on the measured potentials. This abnormality diagnosis device is thus supposed to perform abnormality diagnosis of the plurality of branch-connected CAN communication lines individually.

SUMMARY

This proposed abnormality diagnosis device, however, requires the CAN communication lines to be disconnected from the joint circuit and to be connected with the test circuit and is thus incapable of performing failure diagnosis in an ordinary circuit state. This abnormality diagnosis device also requires the disconnection unit (relay) to disconnect the CAN communication lines from the joint circuit and thereby complicates the circuit configuration.

A main object of the present disclosure is to provide a communication failure detection device that identifies the type of a failure by a simple configuration using two signal detection circuits.

In order to achieve the above primary object, the communication failure detection device of the present disclosure employs the following configuration.

The present disclosure is directed to a communication failure detection device. The communication failure detection device is configured to detect a communication failure of a two-wire CAN communication device that makes communication between nodes according to a CAN protocol. The communication failure detection device includes two signal detection circuits that are provided in each of the nodes and that are configured to detect signals on two communication lines. Each of the nodes is configured to make communication for failure identification that outputs signals of predetermined patterns onto the two communication lines when an execution condition is satisfied in response to occurrence of a protocol error of CAN communication and to perform failure identification that identifies a type of a failure based on a combination of the signals respectively detected by the two signal detection circuits during the communication for failure identification.

The communication failure detection device according to this aspect of the present disclosure detects a communication failure of the two-wire CAN communication device that makes communication between the nodes according to the CAN protocol. Each of the nodes is provided with the two signal detection circuits configured to detect the signals on the two communication lines. Each node makes communication for failure identification to output the signals of the predetermined patterns onto the two communication lines when the execution condition is satisfied in response to the occurrence of a protocol error of CAN communication. Each node then performs the failure identification to identify the type of a failure based on the combination of the signals respectively detected by the two signal detection circuits during the communication for failure identification. This enables the type of a failure of the CAN communication device to be identified by the simple configuration using the two signal detection circuits. The predetermined patterns include a pattern "a" that causes one of the nodes to output a dominant state and causes the other node to output a recessive state; a pattern "b" that causes both the nodes to output the recessive state; and a pattern "c" that causes one of the nodes to output the recessive state and causes the other node to output the dominant state. CAN communication gives priority to the dominant state of the two communication lines (bus) over the recessive state. Accordingly, as long as the CAN communication device is normal, the two communication lines are in the dominant state in the patterns "a" and "c" and are in the recessive state in the pattern "b". The inventors of the present application have found that the two communication lines fall into a different state from the state according to each of the patterns described above on the occurrence of a failure in the CAN communication device and that this different state varies according to the type of the failure. The type of the failure can thus be identified, based on the combination of the respectively detected signals during the communication for failure identification.

BRIEF DESCRIPTION OF DRAWINGS

FIG. 6 is a diagram illustrating one example of the patterns "a" to "c";

FIG. 7 is a diagram illustrating one example of the failure identification matrix;

FIG. 11 is a diagram illustrating the failure identification matrix according to the third embodiment;

FIG. 13 is a diagram illustrating a relationship between the voltages applied on the communication bus and the state signals indicating the states of the communication bus; and FIG. 14 is a diagram illustrating a failure identification matrix according to the fourth embodiment.

DESCRIPTION OF EMBODIMENTS

The following describes some aspects of the disclosure with reference to embodiments.

First Embodiment

Figure 1:
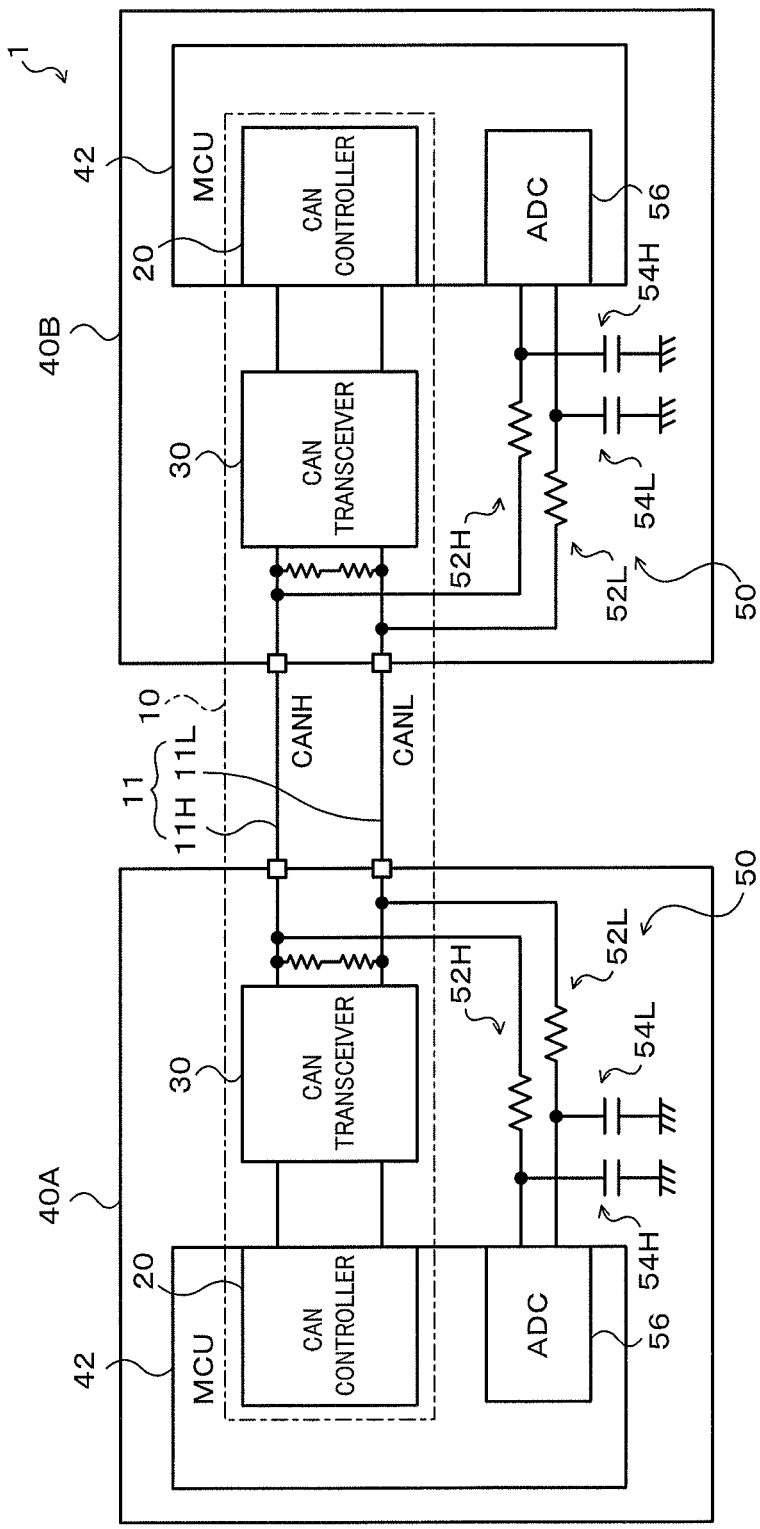
FIG. 1 is a configuration diagram illustrating the schematic configuration of a control system including communication failure detection devices according to a first embodiment.
Figure 2:
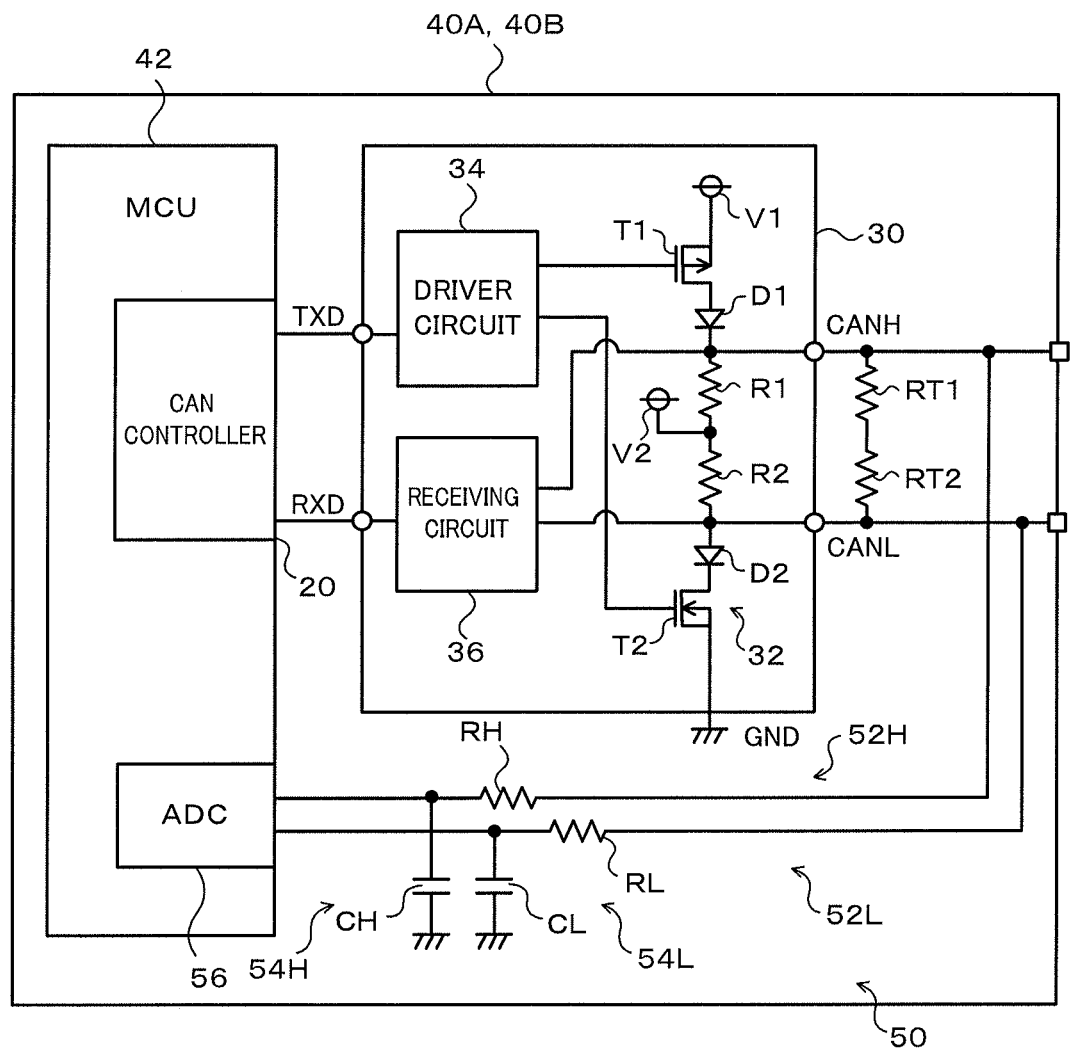
FIG. 2 is a configuration diagram illustrating the schematic configuration of a CAN transceiver.

FIG. 1 is a configuration diagram illustrating the schematic configuration of a control system 1 including communication failure detection devices 50 according to a first embodiment. FIG. 2 is a configuration diagram illustrating the schematic configuration of a CAN transceiver 30. The control system 1 of the first embodiment is mounted on a vehicle and include a plurality of electronic control units (nodes) that are interconnected to make communication therebetween by a CAN communication device 10. As an example of the plurality of electronic control units, a first electronic control unit (hereinafter referred to as first ECU) 40A and a second electronic control unit (hereinafter referred to as second ECU) 40B are illustrated in FIG. 1.

The first ECU 40A and the second ECU 40B respectively include micro control units (hereinafter referred to as MCUs) 42. The respective MCUs 42 serve as control devices of the vehicle and are configured to transmit data therebetween by using the CAN communication device 10.

The CAN communication device 10 is configured as a two-wire differential voltage-system CAN communication device to transmit and receive data based on the presence or the absence of a voltage difference between a CANH line 11H and a CANL line 11L that are two communication lines of a communication bus 11. This CAN communication device 10 has CAN controllers 20 and CAN receivers 30 that are provided for the respective ECUs. The respective CAN transceivers 30 are interconnected via the communication bus 11. Termination resistances RT1 and RT2 (for example, 60Ω) are connected in series with respective ends of the CANH line 11H and the CANL line 11L of the communication bus 11.

According to the embodiment, each of the CAN controllers 20 is mounted on the MCU 42 and is configured to transmit and receive data to and from the communication bus 11 according to a CAN protocol.

Each of the CAN transceivers 30 is connected with the CAN controller 20 via a transmission terminal TXD and a receiving terminal RXD and is also connected with the communication bus 11 (the CANH line 11H and the CANL line 11L) via a CANH terminal and a CANL terminal, so as to relay communication between the CAN controller 20 and the communication bus 11. As shown in FIG. 2, each CAN transceiver 30 includes a transmission circuit 32, a driver circuit 34 and a receiving circuit 36.

The transmission circuit 32 is configured by connecting in series a first power circuit V1 (for example, 5 V power circuit), a transistor T1 (for example, p channel MOSFET), a diode D1, a resistance R1 (for example, 2.5 kΩ), a resistance R2 (for example, 2.5 kΩ), a diode D2, a transistor T2 (for example, n channel MOSFET), and a ground GND in this sequence. The CANH terminal is connected at a connection point between the diode D1 and the resistance R1. The CANL terminal is connected at a connection point between the resistance R2 and the diode D2. A second power circuit V2 (for example, 2.5 V power circuit) is connected at a connection point between the resistance R1 and the resistance R2.

When both the transistors T1 and T2 are off, the potentials of both the CANH terminal and the CANL terminal become equal to the potential of the second power circuit V2, so that the transmission circuit 32 outputs a recessive state to the communication bus 11. According to the embodiment, the second power circuit V2 is configured by a 2.5 V power circuit. In the recessive state, the potentials of the both the CANH terminal and the CANL terminal are accordingly about 2.5 V. When both the transistors T1 and T2 are on, on the other hand, electricity is applied to the diode D1, the resistance R1, the resistance R2 and the diode D2. There is accordingly a potential difference between the CANH terminal and the CANL terminal, so that the transmission circuit 32 outputs a dominant state to the communication bus 11. According to the embodiment, the first power circuit V1 is configured by a 5 V power circuit, and forward voltages of the diodes D1 and D2 are set to about 1.5 V. Accordingly, in the dominant state, the potential of the CANH terminal is about 3.5 V, and the potential of the CANL terminal is about 1.5 V.

The driver circuit 34 is configured to control on and off the transistor T1 and the transistor T2, in response to transmission signals input from the CAN controller 20 via the transmission terminal TXD.

The receiving circuit 36 is connected with the receiving terminal RXD and is also connected with the CANH terminal and the CANL terminal. This receiving circuit 36 is configured to receive the input of voltage signals from the CANH line 11H and the CANL line 11L of the communication bus 11 via the CANH terminal and the CANL terminal and to output the input voltage signals as receiving signals to the CAN controller 20 via the receiving terminal RXD.

The control system 1 of the first embodiment includes the communication failure detection devices 50 configured to identify a cause of a protocol error when the protocol error occurs in the CAN communication device 10. According to the first embodiment, the communication failure detection device 50 is configured by voltage monitor circuits 52H and 52L configured to measure voltages applied to the CANH terminal and the CANL terminal of the CAN transceiver 30 and the MCU 42 configured to receive the input of the voltages measured by the voltage monitor circuits 52H and 52L and identify a failure mode (type of a failure). The voltage monitor circuits 52H and 52L are configured by filters 54H and 54L and an A/D converter 56. The filters 54H and 54L are used to remove noises and are configured as RC filters respectively including resistances RH and RL and capacitors CH and CL. The resistances RH and RL used have relatively high resistance values with a view to suppressing influences on CAN communication. The A/D converter 56 is configured to perform analog-to-digital conversion of a signal (voltage signal) input via the RC filter 54H and a signal (voltage signal) input via the RC filter 54L and output the converted signals to the MCU 42.

Figure 3:
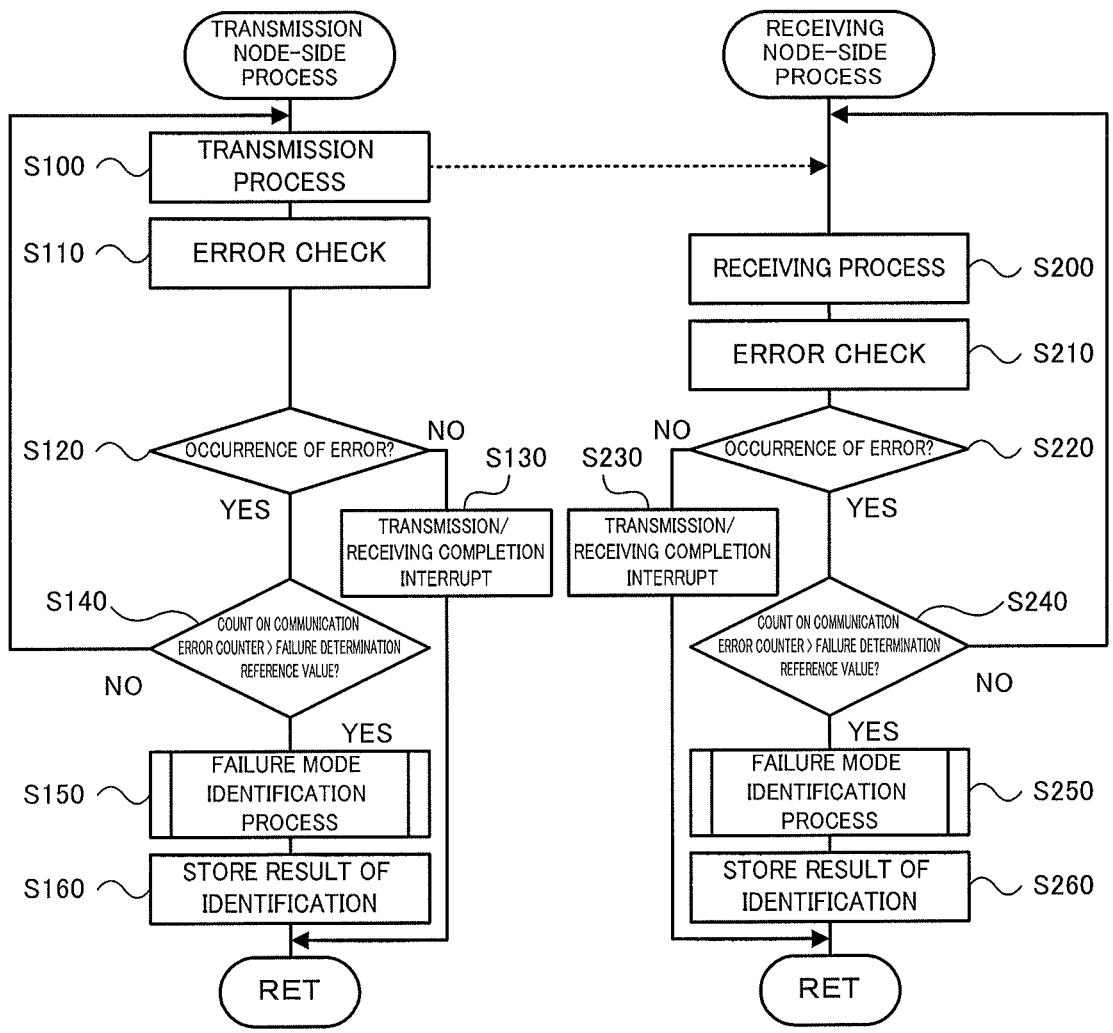
FIG. 3 is a flowchart showing one example of a transmission node-side process and a receiving node-side process performed by a transmission node and a receiving node.
Figure 4:
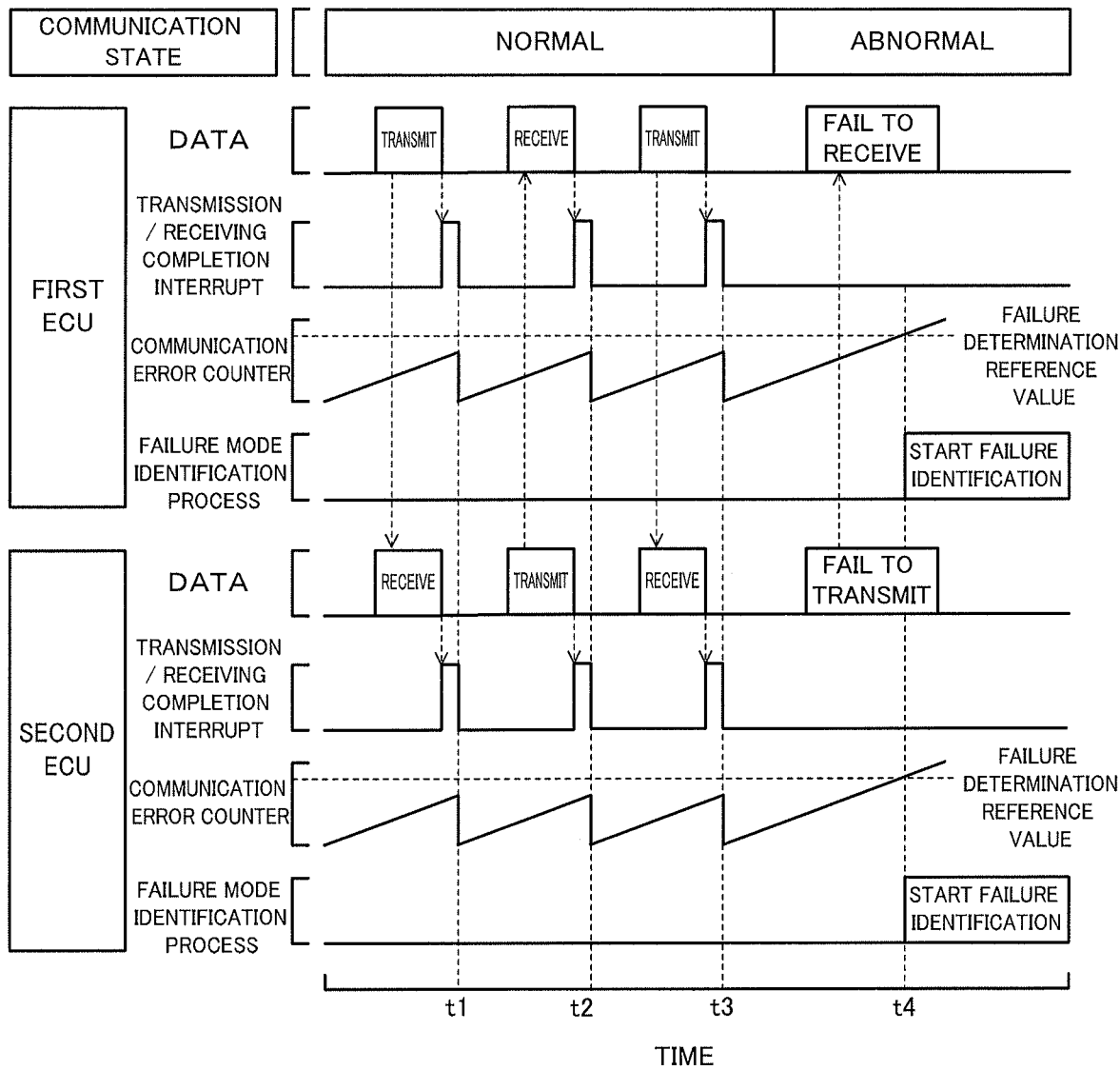
FIG. 4 is a time chart to start failure mode identification in response to the occurrence of a failure during communication.

The following describes operations of the control system 1 according to the first embodiment having the configuration described above or more specifically a series of operations performed by the communication failure detection devices 50. FIG. 3 is a flowchart showing one example of a transmission node-side process and a receiving node-side process performed by a transmission node (i.e., the MCU 42 included in one of the first ECU 40A and the second ECU 40B in the illustrated example of FIG. 1) and a receiving node (i.e., the MCU 42 included in the other of the first ECU 40A and the second ECU 40B in the illustrated example of FIG. 1). The following describes the transmission node-side process and the receiving node-side process with reference to a time chart of FIG. 4.

The transmission node transmits data (data frames) according to the CAN protocol to the communication bus 11 (step S100) and performs an error check of the transmitted data (step S110). The error check performed on the transmission node-side is, for example, bit monitoring or acknowledge check. The receiving node, on the other hand, receives data on the communication bus 11 (step S200) and performs an error check of the received data (step S210). The error check performed on the receiving node-side is, for example, CRC (Cyclic Redundancy Check), form check or stuff check. When the result of the error check indicates non-occurrence of any error (step S120 or step S220), the transmission node or the receiving node generates a transmission/receiving completion interrupt (step S130 or step S230) and terminates the transmission node-side process or the receiving node-side process. When the result of the error check indicates the occurrence of an error, on the other hand, the transmission node or the receiving node proceeds to the subsequent step S140 or step S240 without generating the transmission/receiving completion interrupt. The transmission/receiving completion interrupt is generated to reset a communication error counter to an initial value. The communication error counter is configured to count up or count down the count value by every predetermined time interval, in order to measure the time period required for transmission or receiving, and is reset to the initial value every time the transmission/receiving completion interrupt is generated (at times t1, t2 and t3). The transmission node or the receiving node subsequently determines whether the count value on the communication error counter exceeds a failure determination reference value (step S140 or step S240). The failure determination reference value herein denotes a reference value to determine the generation of a protocol error. According to the embodiment, the failure determination reference value is set equal to a time period (for example, 300 msec) that is longer than a maximum transmission/receiving period by taking into account a load of the communication bus 11. When it is determined that the count value on the communication error counter does not exceed the failure determination reference value, the transmission node or the receiving node returns to step S100 to transmit data again or to step S200 to receive data again. When it is determined that the count value on the communication error counter exceeds the failure determination reference value (at a time t4), on the other hand, the transmission node or the receiving node determines that a failure occurs in the CAN communication device 10 and performs a failure mode identification process to identify the location of the failure (step S150 or step S250). The transmission node or the receiving node stores the result of the failure mode identification process into a non-illustrated storage device (for example, a non-volatile memory) (step S160 or step S260) and then terminates the transmission node-side process or the receiving node-side process.

Figure 5:
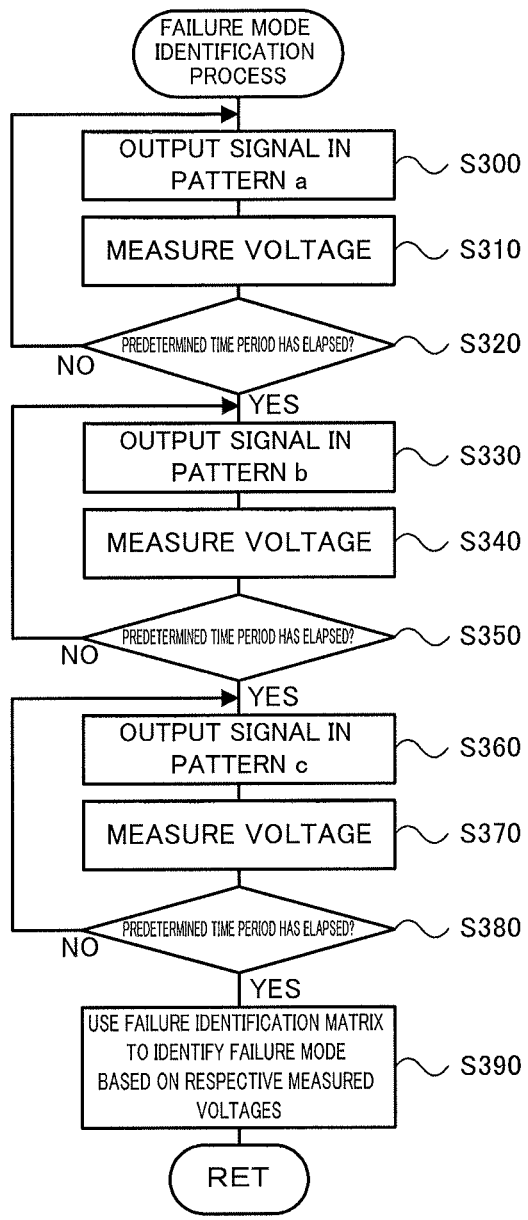
FIG. 5 is a flowchart showing one example of a failure mode identification process performed respectively by the transmission node and the receiving node.

The processing of step S150 or step S250 is performed according to a failure mode identification process shown in FIG. 5. In the failure mode identification process, the transmission node or the receiving node first repeats the output of a signal (dominant or recessive state) onto the communication bus 11 according to a pattern "a" and the measurement of the voltages on the communication bus 11 by the voltage monitor circuits 52H and 52L until elapse of a predetermined time period T (for example, 500 msec) (steps S300 to S320). After elapse of the predetermined time period T, the transmission node or the receiving node subsequently repeats the output of a signal (recessive state) onto the communication path 11 according to a pattern "b" and the measurement of the voltages on the communication bus 11 by the voltage monitor circuits 52H and 52L until elapse of a next predetermined time period T (steps S330 to S350). After elapse of the next predetermined time period T, the transmission node or the receiving node subsequently repeats the output of a signal (dominant or recessive state) onto the communication bus 11 according to a pattern "c" and the measurement of the voltages on the communication bus 11 by the voltage monitor circuits 52H and 52L until elapse of a subsequent predetermined time period T (steps S360 to S380). FIG. 6 is a diagram illustrating one example of the patterns "a" to "c". As illustrated, the pattern "a" is, for example, a pattern that causes the first ECU 40*a* to keep the output of the dominant state for 500 msec and causes the second ECU 40*b* to keep the output of the recessive state for 500 msec. CAN communication gives priority to the dominant state over the recessive state. As long as the CAN communication device 10 is normal, in the pattern "a", the voltage of the CANH terminal is about 3.5 V, whereas the voltage of the CANL terminal is about 1.5 V. The pattern "b" is, for example, a pattern that causes both the first ECU 40A and the second ECU 40B to keep the output of the recessive state for 500 msec. As long as the CAN communication device 10 is normal, in this pattern "b", the voltages of both the CANH terminal and the CANL terminal are about 2.5 V. The pattern "c" is, for example, a pattern that causes the first ECU 40A to keep the output of the recessive state for 500 msec and causes the second ECU 40B to keep the output of the dominant state for 500 msec. As long as the CAN communication device 10 is normal, in the pattern "c", the voltage of the CANH terminal is about 3.5 V, whereas the voltage of the CANL terminal is about 1.5 V. As described above, the failure mode identification process repeats the output of the signal according to each of the patterns and the measurement of the voltages on the communication bus 11 until elapse of the predetermined time period T in each pattern. Even in the case of a slight difference between the start timings of the failure mode identification process performed by the respective nodes (respective MCUs 42), this process enables the difference to be absorbed by the predetermined time period T. In the case of a change in voltage measured during the predetermined time period T in each of the patterns "a" to "c" due to a difference between the start timings of the failure mode identification process performed by the respective nodes, the voltage value measured for the longest time period is specified as the voltage that is to be measured on the communication bus 11. This enables the respective nodes to appropriately measure the voltages on the communication bus 11 in the respective patterns "a" to "c".

After the output of the signals onto the communication bus 11 according to the respective patterns "a" to "c" and the measurement of the voltages applied on the communication bus 11 (the CANH terminal and the CANL terminal) according to the respective patterns "a" to "c" as described above, the transmission node or the receiving node uses a failure identification matrix to identify a failure mode (failure location) (step S390) and then terminates this process. FIG. 7 is a diagram illustrating one example of the failure identification matrix. As illustrated, the failure identification matrix maps the respective combinations of the voltages measured by the voltage monitor circuits 52H and 52L in the respective patterns "a" to "c" to the failure mode (type of failure). The failure mode includes transmission path failures and node failures. The transmission path failures include a CANH disconnection failure, a CANL disconnection failure, a CANH-5V power source short circuit failure, a CANH-GND short circuit failure, a CANL-5V power source short circuit failure, a CANL-GND short circuit failure and a CANH-CANL short circuit failure. The node failures include a dominant fixation failure, an own ECU recessive fixation failure and an opponent ECU recessive fixation failure.

The CANH disconnection failure denotes a state that the CANH line 11H is disconnected to fail to transmit the dominant state (CANH line 11H-side) from an opponent ECU to an own ECU. This state is identified by the measurement of a voltage value of about 1.5 V (abnormal value) as the voltage of the CANH terminal in the pattern "c" and otherwise the measurement of normal values.

The CANL disconnection failure denotes a state that the CANL line 11L is disconnected to fail to transmit the dominant state (CANL line 11L-side) from the opponent ECU to the own ECU. This state is identified by the measurement of a voltage value of about 3.5 V (abnormal value) as the voltage of the CANL terminal in the pattern "c" with otherwise the measurement of normal values.

The CANH-5V power source short circuit failure denotes a state that the CANH line 11H has a short circuit with the first power circuit V1 to keep the voltage of the CANH line 11H at 5 V. This state is identified by the measurement of about 5.0 V (abnormal value) as the voltage of the CANH terminal in all the patterns "a" to "c" and the measurement of about 5.0 V (abnormal value) as the voltage of the CANL terminal in the pattern "b" with otherwise the measurement of normal values.

The CANH-GND short circuit failure denotes a state that the CANH line 11H has a short circuit with the ground GND to keep the voltage of the CANH line 11H at 0 V. This state is identified by the measurement of about 0 V (abnormal value) as the voltage of the CANH terminal in all the patterns "a" to "c" and the measurement of about 0 V (abnormal value) as the voltage of the CANL terminal in the pattern "b" with otherwise the measurement of normal values.

The CANL-5V power source short circuit failure denotes a state that the CANL line 11L has a short circuit with the first power circuit V1 to keep the voltage of the CANL line 11L at 5 V. This state is identified by the measurement of about 5.0 V (abnormal value) as the voltage of the CANH terminal in the pattern "b" and the measurement of about 5.0 V (abnormal value) as the voltage of the CANL terminal in all the patterns "a" to "c" with otherwise the measurement of normal values.

The CANL-GND short circuit failure denotes a state that the CANL line 11L has a short circuit with the ground GND to keep the voltage of the CANL line 11L at 0 V. This state is identified by the measurement of about 0V (abnormal value) as the voltage of the CANH terminal in the pattern "b" and the measurement of about 0 V (abnormal value) as the voltage of the CANL terminal in all the patterns "a" to "c" with otherwise the measurement of normal values.

The CANH-CANL short circuit failure denotes a state that the CANH line 11H has a short circuit with the CANL line 11L to keep the CANH line 11H and the CANL line 11L at an identical potential. This state is identified by the measurement of about 2.5 V (abnormal value) (i.e., the measurement of the recessive state) as the voltages of both the CANH terminal and the CANL terminal in the patterns "a" and "c" with otherwise the measurement of normal values.

The dominant fixation failure denotes a state that either the own ECU or the opponent ECU is continuously fixed to output the dominant state. This state is identified by the measurement of about 3.5 V (abnormal value) as the voltage of the CANH terminal and the measurement of about 1.5 V (abnormal value) as the voltage of the CANL terminal (i.e., the measurement of the dominant state) in the pattern "b" with otherwise the measurement of normal values.

The own ECU recessive fixation failure denotes a state that the dominant state of the own ECU is not transmitted. This state is identified by the measurement of about 2.5 V (abnormal value) as the voltages of both the CANH terminal and the CANL terminal (i.e., the measurement of the recessive state) in the pattern "a" with otherwise the measurement of normal values.

The opponent ECU recessive fixation failure denotes a state that the dominant state of the opponent ECU is not transmitted. This state is identified by the measurement of about 2.5 V (abnormal value) as the voltages of both the CANH terminal and the CANL terminal (i.e., the measurement of the recessive state) in the pattern "c" with otherwise the measurement of normal values.

As described above, the failure mode can be identified, based on the combination of the voltages of the CANH terminal and the CANL terminal measured by the respective voltage monitor circuits 52H and 52L in the respective patterns "a" to "c".

The communication failure detection device 50 of the first embodiment described above has the voltage monitor circuits 52H and 52L that are respectively provided in each of the nodes (the first ECU 40A and the second ECU 40B) to measure the voltages of the CANH line 11H and the CANL line 11L of the communication bus 11. When the count value on the communication error counter exceeds the failure determination reference value, each node outputs the signals of the predetermined patterns "a" to "c" (communication for failure identification). The communication failure detection device 50 of the first embodiment then identifies the failure mode, based on the combination of the voltages respectively detected in the voltage monitor circuits 52H and 52L in the respective patterns "a" to "c" (failure identification). This enables the type of the failure (disconnection failure, short circuit failure or fixation failure) of the CAN communication device 10 to be identified by the simple configuration using the voltage monitor circuits 52H and 52L.

The communication failure detection device 50 of the first embodiment continues the communication for failure dentification and the measurement of the voltages on the communication bus 11 for the predetermined time period T (second predetermined time period) that is longer than the failure determination reference value (first predetermined time period) in the respective patterns "a" to "c". Even in the case of a difference between the start timings of the failure mode identification process performed by the respective nodes, this configuration enables the difference to be absorbed by the predetermined time period T and enables the respective nodes to appropriately measure the voltages on the communication bus 11 in the respective patterns "a" to "c".

Second Embodiment

Figure 8:
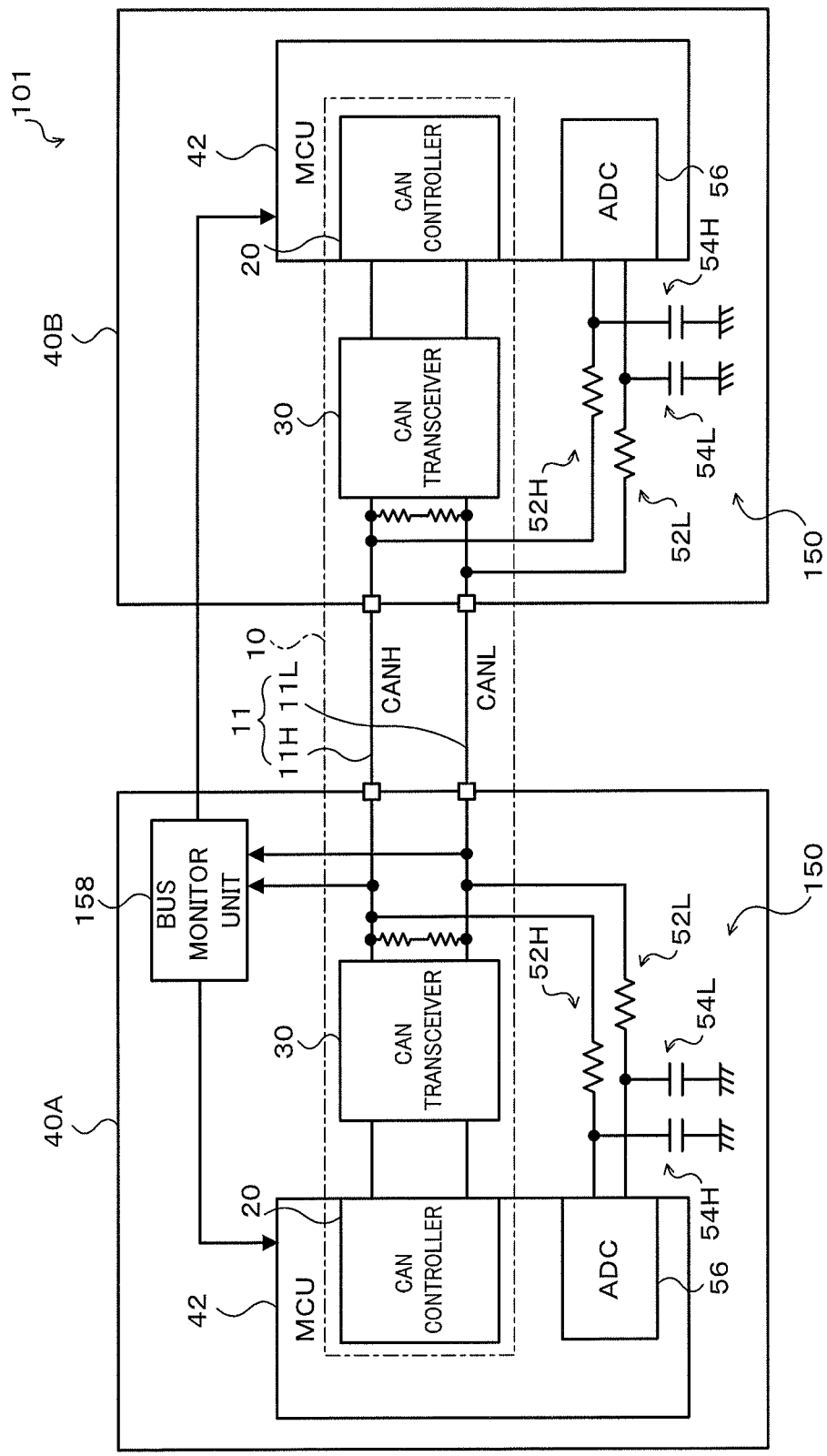
FIG. 8 is a configuration diagram illustrating the schematic configuration of a control system including the communication failure detection device according to a second embodiment.

In the communication failure detection device 50 of the first embodiment, each node resets the count value on the communication error counter to the initial value on every completion of normal transmission and receiving and starts the failure mode identification process when the count value on the communication error counter exceeds the failure determination reference value. A communication failure detection device 150 according to a second embodiment is, on the other hand, includes a bus monitor unit 158 that is configured to monitor the state of the communication bus 11 and to give an instruction for starting the failure mode identification process to each node as needed basis. FIG. 8 is a configuration diagram illustrating the schematic configuration of a control system 101 including the communication failure detection device 150 according to the second embodiment. As illustrated, the communication failure detection device 150 of the second embodiment has a similar configuration to that of the communication failure detection device 50 of the first embodiment, except that the communication failure detection device 150 is provided with the bus monitor unit 158. The bus monitor unit 158 is configured to monitor the state (voltages) of the communication bus 11 and detect the presence or the absence of a protocol error and is connected to output signals to the MCUs 42 of the respective nodes (the first ECU 40A and the second ECU 40B). The bus monitor unit 158 is mounted on the first ECU 40A in the illustrated example of FIG. 8 but may be mounted on the second ECU 40B or may be placed outside of the first ECU 40A and the second ECU 40B.

Figure 9:
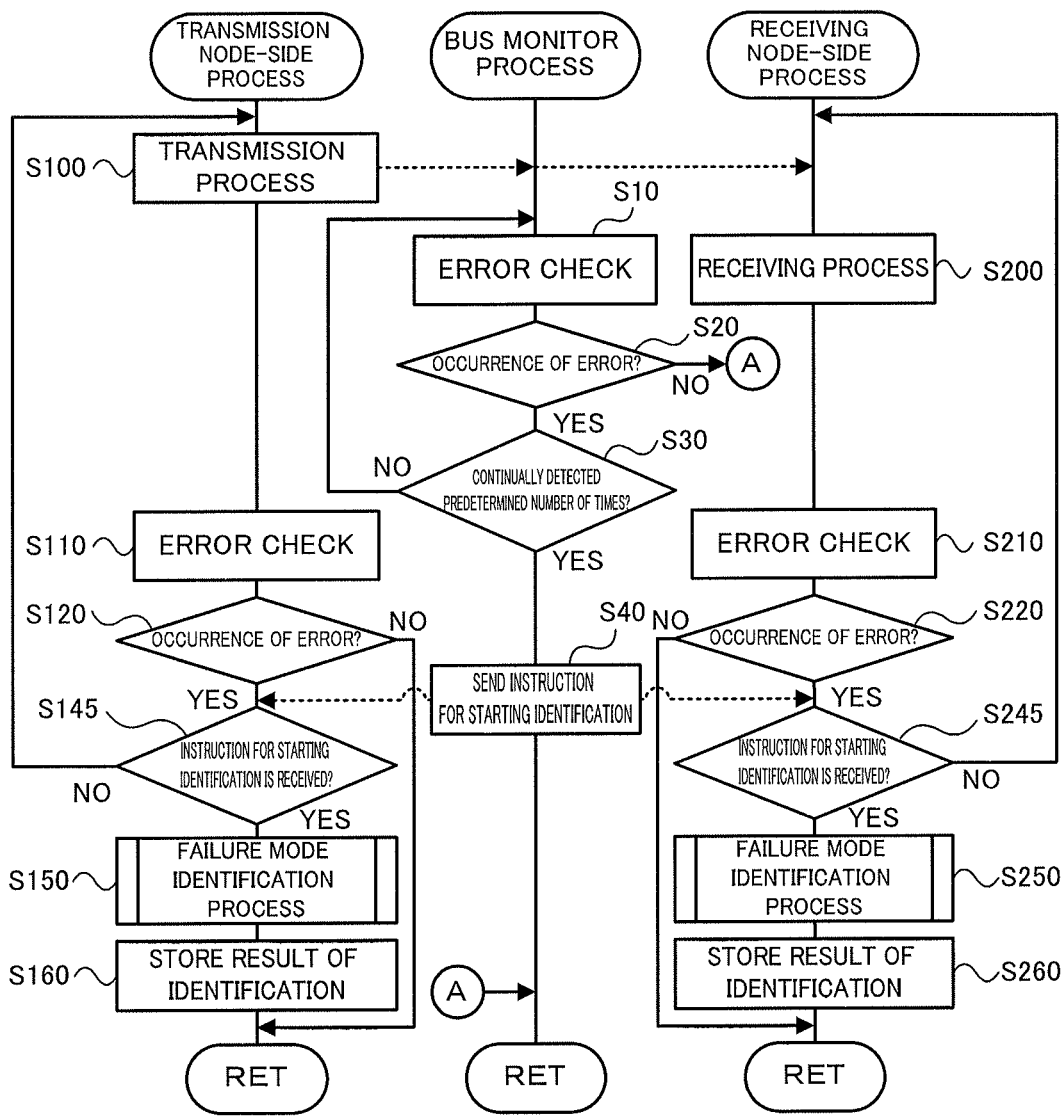
FIG. 9 is a flowchart showing one example of a transmission node-side process, a receiving node-side process, and a bus monitor process according to a second embodiment.

FIG. 9 is a flowchart showing one example of a transmission node-side process, a receiving node-side process and a bus monitor process performed by the transmission node, the receiving node, and the bus monitor unit 158 according to the second embodiment. The transmission node transmits data (data frames) to the communication bus 11 (step S100) and performs an error (protocol error) check of the transmitted data (step S110). The receiving node, on the other hand, receives data on the communication bus 11 (step S200) and performs an error check of the received data (step S210). The bus monitor unit 158 monitors the state of the communication bus 11 and performs an error check of the data (step S10). When the result of the error check indicates non-occurrence of any error, the transmission node, the receiving node or the bus monitor unit 158 terminate the transmission node-side process, the receiving node-side process or the bus monitor process. When the result of the error check indicates the occurrence of an error, on the other hand, the bus monitor unit 158 determines whether the occurrence of an error is continually detected a predetermined number of times (step S30). The predetermined number of times herein denotes a predetermined frequency required to determine the occurrence of a communication error. When it is determined that the occurrence of an error is not continually detected the predetermined number of times, the bus monitor unit 158 returns to step S10. When it is determined that the occurrence of an error is continually detected the predetermined number of times, on the other hand, the bus monitor unit 158 gives an instruction for starting the failure mode identification process to the transmission node and to the receiving node (step S40) and then terminates the bus monitor process. When the result of the error check indicates the occurrence of an error at step S120 or at step S220, the transmission node or the receiving node subsequently determines whether an instruction for starting the failure mode identification process is given by the bus monitor unit 158 (step S145 or step S245). When the instruction for starting the failure mode identification process is not given, the transmission node or the receiving node returns to step S100 to transmit data again or to step S200 to receive data again. When the instruction for starting the failure mode identification process is given, on the other hand, the transmission node or the receiving node starts the failure mode identification process (step S150 or step S250), stores the result of the failure mode identification process (step S160 or step S260) and then terminates the transmission node-side process or the receiving node-side process. As described above, the bus monitor unit 158 monitors the state of the communication bus 11 and gives an instruction for starting the failure mode identification process to the transmission node and to the receiving node as needed basis. This configuration enables the start timings of the failure mode identification process performed by the transmission node and by the receiving node to be synchronized with each other. This enables the voltages on the communication bus 11 to be appropriately measured by the voltage monitor circuits 52H and 52L in the respective patterns "a" to "c" and thereby reduces the possibility of an identification error of the failure location. According to the second embodiment, the bus monitor unit 158 serves to synchronize the start timings of the failure mode identification process performed by the respective nodes. Accordingly, in the failure mode identification process of the second embodiment, the processing of steps S320, S350 and S380 may be omitted, or a shorter time period than the time period used in the first embodiment may be set to the predetermined time period T.

Third Embodiment

Figure 10:
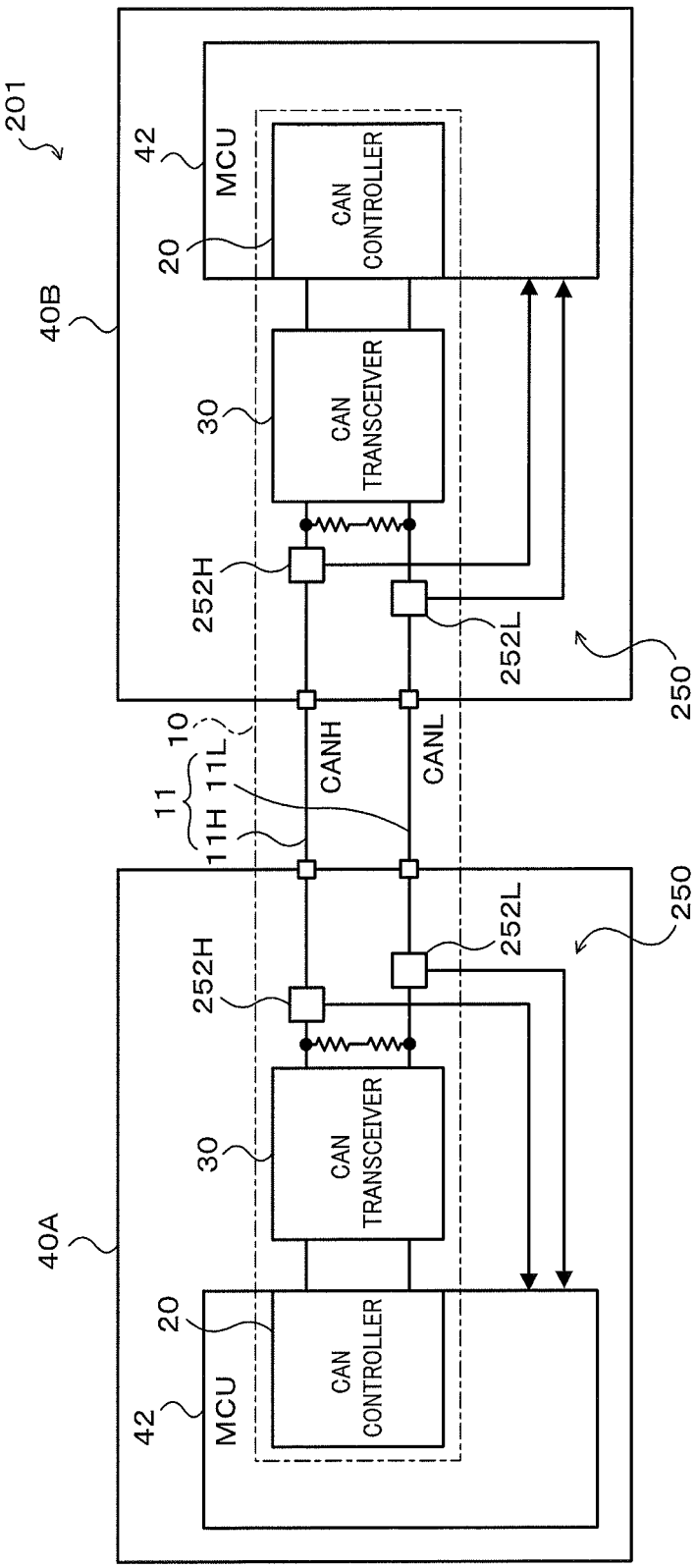
FIG. 10 is a configuration diagram illustrating the schematic configuration of a control system including the communication failure detection device according to the third embodiment.

The communication failure detection device 50 of the first embodiment is provided with the voltage monitor circuits 52H and 52L configured to monitor the voltages applied on the CANH terminal and the CANL terminal of the CAN transceiver 30 for the purpose of monitoring the state of the communication bus 11. A communication failure detection device 250 according to a third embodiment is, on the other hand, provided with current monitor circuits 252H and 252L configured to monitor the electric currents output from the CANH terminal and the CANL terminal of the CAN transceiver 30. FIG. 10 is a configuration diagram illustrating the schematic configuration of a control system 201 including the communication failure detection device 250 according to the third embodiment. As illustrated, the communication failure detection device 250 includes the current monitor circuit 252H configured to measure the electric current output from the CANH terminal and the current monitor circuit 252L configured to measure the electric current output from the CANL terminal. The electric currents measured respectively by the current monitor circuits 252H and 252L are input into the MCU 42. According to the third embodiment, the failure mode identification process makes measurement of the electric currents by the current monitor circuits 252H and 252L, in place of the measurement of the voltages by the voltage monitor circuits 52H and 52L at steps S310, S340 and S370. The failure mode identification process then identifies the failure mode by using a failure identification matrix, based on the combinations of the measured electric currents in the respective patterns "a" to "c".

FIG. 11 is a diagram illustrating the failure identification matrix according to the third embodiment. As illustrated, the failure identification matrix of the third embodiment maps the respective combinations of the electric currents measured by the current monitor circuits 252H and 252L in the respective patterns "a" to "c" to the failure mode (type of failure). The failure mode includes transmission path failures and node failures. The transmission path failures include a CANH disconnection failure, a CANL disconnection failure, a CANH-5V power source short circuit failure, a CANH-GND short circuit failure, a CANL-5V power source short circuit failure, a CANL-GND short circuit failure and a CANH-CANL short circuit failure like the first embodiment. The node failures, on the other hand, include an own ECU dominant fixation failure, an opponent ECU dominant fixation failure and a recessive fixation failure slightly different from the first embodiment. As long as the CAN communication device 10 is normal, in the pattern "a", the output current of the CANH terminal is about +16.6 mA where the direction from the CANH terminal toward the CANH line 11H is a positive direction, whereas the output current of the CANL terminal is about −16.6 mA where the direction from the CANL terminal toward the CANL line 11L is a positive direction. As long as the CAN communication device 10 is normal, in the pattern "b", the output currents of both the CANH terminal and the CANL terminal are about 0 mA. As long as the CAN communication device 10 is normal, in the pattern "c", the output current of the CANH terminal is about −16.6 mA, whereas the output current of the CANL terminal is about +16.6 mA.

The CANH disconnection failure is identified by the measurement of about 0 mA (abnormal value) as the output current of the CANH terminal and about −2 mA (abnormal value) as the output current of the CANL terminal in the pattern "a" and the measurement of about 0 mA (abnormal value) as the output current of the CANH terminal and about +2 mA (abnormal value) as the output current of the CANL terminal in the pattern "c" with otherwise the measurement of normal values.

The CANL disconnection failure is identified by the measurement of about +2 mA (abnormal value) as the output current of the CANH terminal and about 0 mA (abnormal value) as the output current of the CANL terminal in the pattern "a" and the measurement of about −2 mA (abnormal value) as the output current of the CANH terminal and about 0 mA (abnormal value) as the output current of the CANL terminal in the pattern "c" with otherwise the measurement of normal values.

The CANH-5V power source short circuit failure is identified by the measurement of about −30 mA (abnormal value) as the output currents of both the CANH terminal and the CANL terminal in the pattern "a", the measurement of about −2 mA (abnormal value) as the output current of the CANH terminal in the pattern "b", and the measurement of about −30 mA (abnormal value) as the output current of the CANH terminal and about +30 mA (abnormal value) as the output current of the CANL terminal in the pattern "c" with otherwise the measurement of a normal value.

The CANH-GND short circuit failure is identified by the measurement of about +50 mA or higher (abnormal value) as the output current of the CANH terminal and about 0 mA (abnormal value) as the output current of the CANL terminal in the pattern "a", the measurement of about +2 mA (abnormal value) as the output current of the CANH terminal in the pattern "b", and the measurement of about +2 mA (abnormal value) as the output current of the CANH terminal and about 0 mA (abnormal value) as the output current of the CANL terminal in the pattern "c" with otherwise the measurement of a normal value.

The CANL-5V power source short circuit failure is identified by the measurement of about 0 mA (abnormal value) as the output current of the CANH terminal and about −50 mA or lower (abnormal value) as the output current of the CANL terminal in the pattern "a", the measurement of about −2 mA (abnormal value) as the output current of the CANL terminal in the pattern "b", and the measurement of about 0 mA (abnormal value) as the output current of the CANH terminal and about −2 mA (abnormal value) as the output current of the CANL terminal in the pattern "c" with otherwise the measurement of a normal value.

The CANL-GND short circuit failure is identified by the measurement of about +30 mA (abnormal value) as the output currents of both the CANH terminal and the CANL terminal in the pattern "a", the measurement of about +2 mA (abnormal value) as the output current of the CANL terminal in the pattern "b", and the measurement of about −30 mA (abnormal value) as the output current of the CANH terminal and about +30 mA (abnormal value) as the output current of the CANL terminal in the pattern "c" with otherwise the measurement of a normal value.

The CANH-CANL short circuit failure is identified by the measurement of about 0 mA (abnormal value) as the output currents of both the CANH terminal and the CANL terminal in the patterns "a" and "c" with otherwise the measurement of normal values.

The own ECU dominant fixation failure denotes a state that both the CANH terminal and the CANL terminal of the own ECU are continuously fixed to output the dominant state. This state is identified by the measurement of about +16.6 mA (abnormal value) as the output current of the CANH terminal and about −16.6 mA (abnormal value) as the output current of the CANL terminal in the pattern "b" and the measurement of about 0 mA (abnormal value) as the output currents of both the CANH terminal and the CANL terminal in the pattern "c" with otherwise the measurement of normal values.

The opponent ECU dominant fixation failure denotes a state that both the CANH terminal and the CANL terminal of the opponent ECU are continuously fixed to output the dominant state. This state is identified by the measurement of about 0 mA (abnormal value) as the output currents of both the CANH terminal and the CANL terminal in the pattern "a" and the measurement of about +16.6 mA (abnormal value) as the output current of the CANH terminal and −16.6 mA (abnormal value) as the output current of the CANL terminal in the pattern "b" with otherwise the measurement of normal values.

The recessive fixation failure denotes a state that both the CANH terminal and the CANL terminal of either the own ECU or the opponent ECU are continuously fixed to output the recessive state. This state is identified by the measurement of about 0 mA (abnormal value) as the output currents of both the CANH terminal and the CANL terminal in the patterns "a" and "c" with otherwise the measurement of normal values.

As described above, the configuration of the third embodiment makes measurement of the output currents of the CANH terminal and the CANL terminal of the CAN transceiver 30 by using the current monitor circuits 252H and 252L in the respective patterns "a" to "c" and thereby identifies the failure location based on the combination of the measured output currents. On the occurrence of a disconnection failure (CANH disconnection failure or CANL disconnection failure), a failure mode that is likely to occur, the configuration of the first embodiment requires the own ECU and the opponent ECU to be synchronized with each other and make communication for failure identification in the pattern "c", in order to identify a disconnection failure based on the state that the dominant output is not transmitted from the opponent ECU in the pattern "c" as shown in FIG. 7. The configuration of the third embodiment, on the other hand, identifies a disconnection failure based on the state that no current flows from the CANH terminal or the CANL terminal in the dominant state of the own ECU. This configuration thus enables a disconnection failure to be identified by the own ECU alone without taking into account the synchronization with the opponent ECU.

Fourth Embodiment

Figure 12:
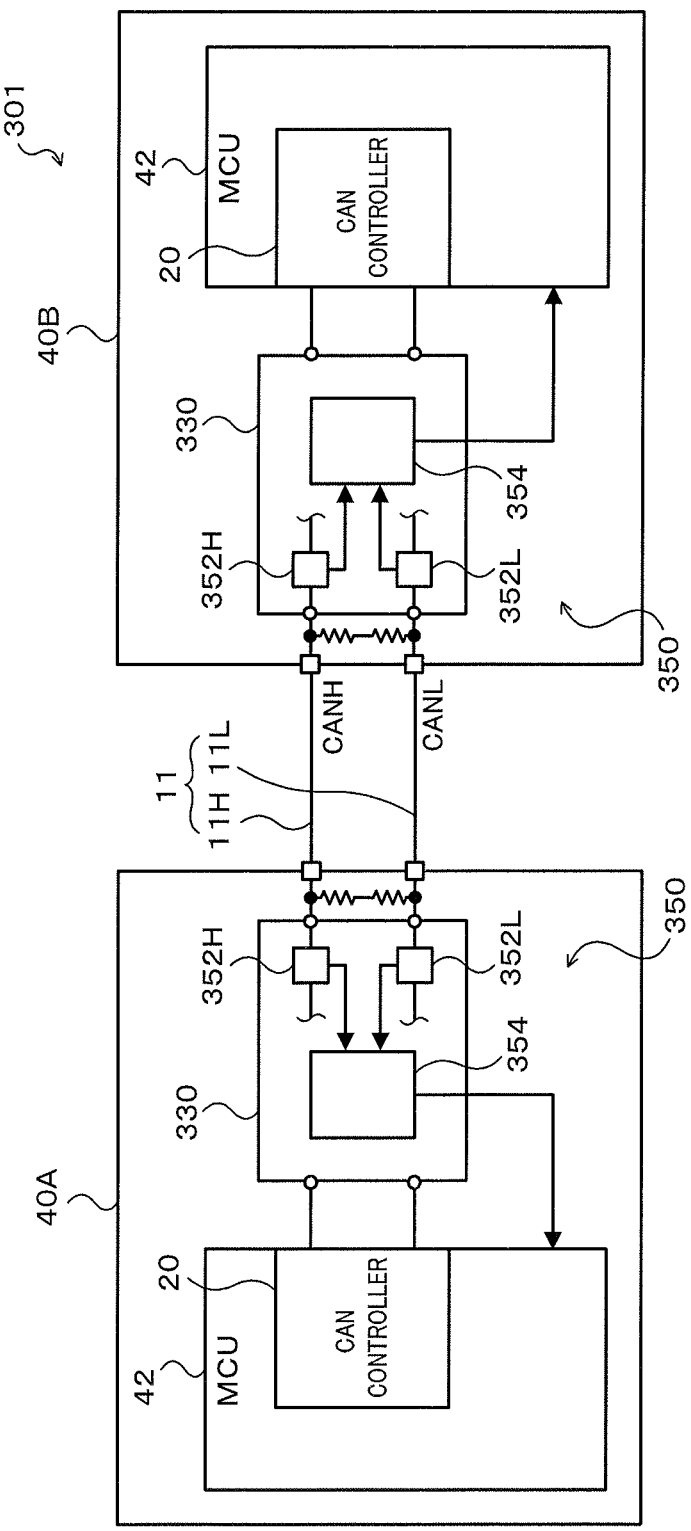
FIG. 12 is a configuration diagram illustrating the schematic configuration of a control system including the communication failure detection device according to a fourth embodiment.

The communication failure detection device 50 of the first embodiment is configured such that the signals of the voltage monitor circuits 52H and 52L are directly input into the MCU 42. A communication failure detection device 350 according to a fourth embodiment is, on the other hand, configured, such that signals of voltage monitor circuits 352H and 352L are input into a state determination circuit 354 and that a signal from the state determination circuit 354 is input into the MCU 42. FIG. 12 is a configuration diagram illustrating the schematic configuration of a control system 301 including the communication failure detection device 350 according to the fourth embodiment. The communication failure detection device 350 of the fourth embodiment includes the voltage monitor circuit 352H configured to measure the voltage of the CANH terminal, the voltage monitor circuit 352L configured to measure the voltage of the CANL terminal, and the state determination circuit 354 configured to receive the input of the voltages measured by the voltage monitor circuits 352H and 352L, determine the states of the communication bus 11, and output state signals indicating the determined states to the MCU 42.

FIG. 13 is a diagram illustrating a relationship between the voltages applied on the communication bus 11 and the state signals indicating the states of the communication bus 11. As described above, according to the embodiment, in the dominant state, as long as the CAN communication device 10 is normal, a voltage of about 3.5 V is applied onto the CANH terminal and a voltage of about 1.5 V is applied onto the CANL terminal. In the recessive state, on the other hand, as long as the CAN communication device 10 is normal, a voltage of about 2.5 V is applied onto both the CANH terminal and the CANL terminal. This means that either the voltage of about 3.5 V or the voltage of about 2.5 V is generally applied onto the CANH terminal and that either the voltage of about 1.5 V or the voltage of about 2.5 V is generally applied onto the CANL terminal. Accordingly, the CANH terminal fall into in an abnormal state having the voltage of higher than the normal value (High abnormality state) when the voltage is about 5.0 V. The CANH terminal is in the dominant state when the voltage is about 3.5 V. The CANH terminal is in the recessive state when the voltage is about 2.5 V. The CANH terminal falls into an abnormal state having the voltage of lower than the normal value (Low abnormality state) when the voltage is about 1.5 V or about 0 V. The CANL terminal, on the other hand, falls into the abnormal state having the voltage of higher than the normal value (High abnormality state) when the voltage is about 3.5 V or about 5.0 V. The CANL terminal is in the recessive state when the voltage is about 2.5 V. The CANL terminal is in the dominant state when the voltage is about 1.5 V. The CANL terminal falls into the abnormal state having the voltage of lower than the normal value (Low abnormality state) when the voltage is about 0 V.

FIG. 14 is a diagram illustrating a failure identification matrix according to the fourth embodiment. The types of the failure mode in the failure identification matrix of the fourth embodiment are similar to those in the failure identification matrix of the first embodiment shown in FIG. 7. The failure identification matrix of the fourth embodiment is provided by replacing the voltage values of the respective patterns (patterns "a" to "c") and of the respective terminals (the CANH terminal and the CANL terminal) in the failure identification matrix of the first embodiment by the state signals (the dominant state, the recessive state, the High abnormality state and the Low abnormality state) of the respective patterns and of the respective terminals. This configuration outputs the state signals, which are converted from the voltages of the CANH terminal and the CANL terminal respectively measured by the voltage monitor circuits 352H and 352L in the respective patterns "a" to "c", into the MCU 40 and identifies the failure mode based on the combination of the state signals input into the MCU 40. This configuration enhances the residence of the circuit against the external noise and thereby effectively reduces the malfunction and the damage of the MCU 42, compared with the configuration of directly inputting the signals of the CANH terminal and the CANL terminal into the MCU 42.

As described above, the communication failure detection device according to one aspect of the present disclosure is configured to detect a communication failure of a two-wire CAN communication device that makes communication between nodes according to a CAN protocol. The communication failure detection device comprises two signal detection circuits that are provided in each of the nodes and that are configured to detect signals on two communication lines. Each of the nodes is configured to make communication for failure identification that outputs signals of predetermined patterns onto the two communication lines when an execution condition is satisfied in response to occurrence of a protocol error of CAN communication and to perform failure identification that identifies a type of a failure based on a combination of the signals respectively detected by the two signal detection circuits during the communication for failure identification.

The communication failure detection device according to this aspect of the present disclosure detects a communication failure of the two-wire CAN communication device that makes communication between the nodes according to the CAN protocol. Each of the nodes is provided with the two signal detection circuits configured to detect the signals on the two communication lines. Each node makes communication for failure identification to output the signals of the predetermined patterns onto the two communication lines when the execution condition is satisfied in response to the occurrence of a protocol error of CAN communication. Each node then performs the failure identification to identify the type of a failure based on the combination of the signals respectively detected by the two signal detection circuits during the communication for failure identification. This enables the type of a failure of the CAN communication device to be identified by the simple configuration using the two signal detection circuits. The predetermined patterns include a pattern "a" that causes one of the nodes to output a dominant state and causes the other node to output a recessive state; a pattern "b" that causes both the nodes to output the recessive state; and a pattern "c" that causes one of the nodes to output the recessive state and causes the other node to output the dominant state. CAN communication gives priority to the dominant state of the two communication lines (bus) over the recessive state. Accordingly, as long as the CAN communication device is normal, the two communication lines are in the dominant state in the patterns "a" and "c" and are in the recessive state in the pattern "b". The inventors of the present application have found that the two communication lines fall into a different state from the state according to each of the patterns described above on the occurrence of a failure in the CAN communication device and that this different state varies according to the type of the failure. The type of the failure can thus be identified, based on the combination of the respectively detected signals during the communication for failure identification.

In the communication failure detection device according to the aspect of the present disclosure described above, the execution condition may be satisfied when each of the nodes fails to make normal communication for a first predetermined time period, and each of the nodes may continue the communication for failure identification for a second predetermined time period. The second predetermined time period may be longer than the first predetermined time period. Even when there is a difference in start timings of the communication for failure identification made by the respective nodes, this configuration enables the difference to be absorbed by the second predetermined time period. This configuration accordingly enables the respective nodes to appropriately detect the signals on the communication lines in the predetermined patterns and thereby reduces the possibility of an identification error of communication failure.

In the communication failure detection device according to another aspect of the present disclosure, the communication failure detection device may further include an error monitor unit configured to monitor the occurrence of the protocol error of CAN communication. The error monitor unit may send an instruction for performing the failure identification to each of the nodes when the execution condition is satisfied in response to the occurrence of the protocol error, and each of the nodes may start the communication for failure identification when receiving the instruction for performing the failure identification from the error monitor unit. This configuration enables the start timings of the communication for failure identification made by the respective nodes to be readily adjusted to each other. This configuration accordingly enables the respective nodes to appropriately detect the signals on the communication lines in the predetermined patterns and thereby reduces the possibility of an identification error of communication failure.

In the communication failure detection device according to another aspect of the present disclosure, the two signal detection circuits may be two voltage detection circuits configured to detect voltages applied onto the two communication lines, and each of the nodes may perform the failure identification based on a combination of the voltages respectively detected by the two voltage detection circuits during the communication for failure identification. This configuration enables the states of the two communication lines to be directly detected by using the two voltage detection circuits and thereby ensures the more appropriate identification of the communication failure.

In the communication failure detection device according to another aspect of the present disclosure, the two signal detection circuits may be two current detection circuits configured to detect electric currents output onto the two communication lines, and each of the nodes may perform the failure identification based on a combination of the electric currents respectively detected by the two current detection circuits during the communication for failure identification. This configuration ensures the more appropriate detection of disconnection of one of the two communication lines. In the case of disconnection of one communication line out of two communication lines, the current detection circuit provided in an own node that is in the dominant state detects the state that no electric current flows to the one communication line. This configuration enables disconnection of the one communication line to be determined, irrespective of the state of an opponent node (either the dominant state or the recessive state).

In the communication failure detection device according to another aspect of the present disclosure, each of the nodes may include a control device configured to perform the failure identification based on a combination of states of the two communication lines and a state determination unit provided separately from the control device and configured to receive input of output signals from the two signal detection circuits and to determine the states of the two communication lines. The state determination unit may send state signals indicating the states of the two signal lines to the control device. This configuration suppresses noise contamination and reduces the possibility of malfunction of the control device, compared with a configuration that directly outputs the output signals of the two signal detection circuits to the control device.

The following describes the correspondence relationship between the primary components of the embodiment and the primary components of the disclosure described in Summary. The first ECU 40A (MCU42) and the second ECU 40B (MCU42) of the embodiment correspond to the "node", the CAN communication device 10 corresponds to the "CAN communication device", the CANH line 11H and a CANL line 11L correspond to the "two communication lines", the voltage monitor circuits 52H, 52L, 352H, 352L, current monitor circuits 252H and 252L correspond to the "signal detection circuits". Further, the bus monitor unit 158 corresponds to the "error monitor unit". Furthermore, the voltage monitor circuits 52H, 52L, 352H, 352L correspond to the "voltage detection circuit". Furthermore, the current monitor circuits 252H and 252L correspond to the "current detection circuit". The MCU42 corresponds to the "control device", and the state determination circuit 354 corresponds to the "state determination unit".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

The technique of the disclosure is preferably applicable to the manufacturing industries of the communication failure detection device and so on.

What is claimed is:

1. A communication failure detection device configured to detect a communication failure of a two-wire CAN communication device that makes communication between nodes according to a CAN protocol,
the communication failure detection device comprising:
two signal detection circuits that are provided in each of the nodes and that are configured to detect signals on two communication lines, wherein
each of the nodes is configured to make communication for failure identification that outputs signals of predetermined patterns onto the two communication lines when an execution condition is satisfied in response to occurrence of a protocol error of CAN communication and to perform failure identification that identifies a type of a failure based on a combination of the signals respectively detected by the two signal detection circuits during the communication for failure identification, wherein
the execution condition is satisfied when each of the nodes fails to make normal communication for a first predetermined time period, and
each of the nodes continues the communication for failure identification for a second predetermined time period, and wherein
the second predetermined time period is longer than the first predetermined time period.

2. The communication failure detection device according to claim 1, further comprising:
an error monitor unit configured to monitor the occurrence of the protocol error of CAN communication,
wherein the error monitor unit sends an instruction for performing the failure identification to each of the nodes when the execution condition is satisfied in response to the occurrence of the protocol error, and
each of the nodes starts the communication for failure identification when receiving the instruction for performing the failure identification from the error monitor unit.

3. The communication failure detection device according to claim 1,
wherein the two signal detection circuits are two voltage detection circuits configured to detect voltages applied onto the two communication lines, and
each of the nodes performs the failure identification based on a combination of the voltages respectively detected by the two voltage detection circuits during the communication for failure identification.

4. The communication failure detection device according to claim 1,
wherein the two signal detection circuits are two current detection circuits configured to detect electric currents output onto the two communication lines, and
each of the nodes performs the failure identification based on a combination of the electric currents respectively detected by the two current detection circuits during the communication for failure identification.

5. The communication failure detection device according to claim 1,
wherein each of the nodes comprises a control device configured to perform the failure identification based on a combination of states of the two communication lines; and a state determination unit provided separately from the control device and configured to receive input of output signals from the two signal detection circuits and to determine the states of the two communication lines, wherein
the state determination unit sends state signals indicating the states of the two signal lines to the control device.

* * * * *